United States Patent [19]

Kang

[11] Patent Number: 4,587,738

[45] Date of Patent: May 13, 1986

[54] MEASURING RULE WITH NUMERICAL COUNTER

[76] Inventor: Young H. Kang, Kyungin Jutaek 1-Dong 101-Ho 508-2, Shinwal 2-Dong, Kangseo-Ku, Seoul, Rep. of Korea

[21] Appl. No.: 664,494

[22] Filed: Oct. 25, 1984

[30] Foreign Application Priority Data

May 21, 1984 [KR] Rep. of Korea ............... 84-4653[U]
Jun. 27, 1984 [KR] Rep. of Korea ............... 84-6051[U]

[51] Int. Cl.⁴ ............................................. G01B 3/12
[52] U.S. Cl. ........................................... 33/139; 33/502
[58] Field of Search ................. 33/138, 139, 140, 502

[56] References Cited

U.S. PATENT DOCUMENTS

| | | | |
|---|---|---|---|
| 743,531 | 11/1903 | Mahon | 33/140 |
| 3,566,477 | 3/1971 | Williams | 33/139 X |
| 3,780,440 | 12/1973 | Taylor | 33/139 |
| 4,316,081 | 2/1982 | Washizuka et al. | 33/139 X |

Primary Examiner—William D. Martin, Jr.
Attorney, Agent, or Firm—Finnegan, Henderson, Farabow, Garrett & Dunner

[57] ABSTRACT

A measuring rule including a numerical counter with a tapered knurled shaft mounted for rotation, a rotating spool having an elongated cord wound around it and spring bias means for rewinding the cord around the spool. Stop means are provided for automatically preventing rewinding of the cord about the spool until the stop means is disengaged by the user of the rule, while permitting the cord to be freely pulled off the spool. The cord passes from the spool around the knurled shaft to turn it and the counter as the cord is pulled off the spool, through the stop means and out of the housing so that the length of cord pulled out of the rule and passing around the knurled shaft is indicated by the numerical counter. Error correcting means are further provided for adjusting the location where the cord passes around the tapered shaft along its length.

6 Claims, 16 Drawing Figures

MEASURING RULE WITH NUMERICAL COUNTER

FIELD OF THE INVENTION

The present invention relates to a measuring rule and, more particularly, to a measuring rule on which the length measured is indicated in numerals on a numerical counter.

BACKGROUND OF THE INVENTION

Generally, the tapes of conventional measuring rules are made of steel or fabric and the user has to pull out the tape and carefully observe the scale on it in order to determine the length being measured.

Such conventional rules, however, have some drawbacks. Generally they are not suitable for measuring bumpy surfaces because of the width of tape, and it is often difficult for the user to accurately observe the scale.

SUMMARY OF THE INVENTION

The present invention is an improvement of a conventional measuring rule and comprises a housing, a numerical counter having a knurled shaft mounted for rotation within the housing, a rotatable spool mounted in the housing, an elongated cord wound around the spool, spring bias means for rewinding the cord around the spool and stop means for automatically preventing rewinding of the cord about the spool until the stop means is disengaged by the user of the rule while permitting the cord to be freely pulled off the spool, said cord passing from the spool around the knurled shaft to turn it and the counter as the cord is pulled off the spool, through the stop means and out of the housing, whereby the length of cord pulled out of the rule and passing around the knurled shaft is indicated by the numerical counter.

DETAILED DESCRIPTION OF THE PRESENT INVENTION

The following explanation describes the embodiments of the invention with reference to the drawings.

Figure 1:
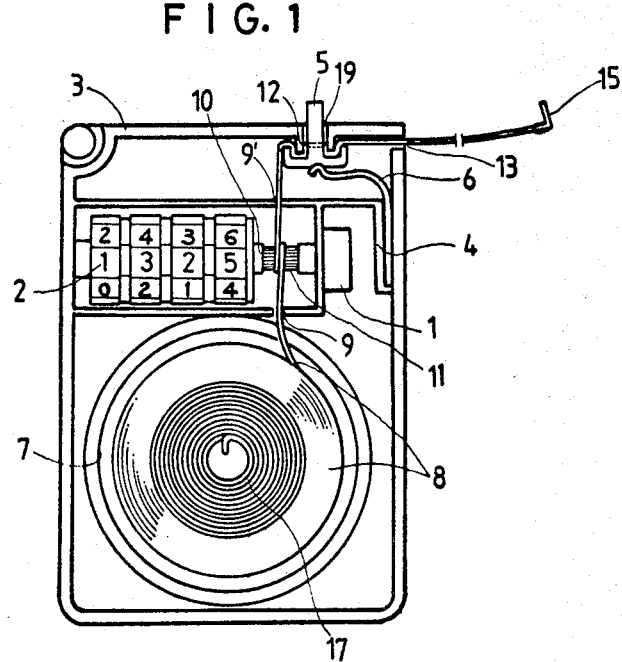
FIG. 1 is a front view of one embodiment of the device of the present invention with the cover removed.

With reference to FIG. 1, the measuring rule of this invention includes a housing 3 and a numerical counter 2 having shaft 10 with a knurled surface 11 mounted for rotation on a frame 4 within housing 3. A flexible measuring cord 8 is wound on a rotatable spool 7 having spring bias means such as a coil spring 17 for rewinding the measuring cord back around the spool after use.

In accordance with the invention stop means are provided for automatically preventing rewinding of the cord about the spool until the stop means is disengaged by the user of the rule, yet that permits the cord to be freely pulled off the spool as the measuring cord is pulled out of the housing. An embodied, this stop means comprises a control button 5 accessible by the user which is biased in a locking position by a leaf spring 6.

As best shown in FIG. 1, control button 5 has essentially an inverted T-shape and a hole 12 through which cord 8 passes. When the user pulls out on the cord 8, control button 5 is pulled downward by the force of the cord being pulled out through hole 12 overcoming the opposite force of spring 6 so that the cord can be pulled out smoothly. After the user stops pulling out the cord, however, leaf spring 6 will push the bottom of the button back up, because there is no longer any force tending to pull it down, the button will lock the cord against stops 19 on the inside surface of the housing. This prevents cord 8 from being pulled back onto the spool 7 by spring 17 until the user has had a chance to read the numercial counter and determine the length being measured.

If the button 5 is then pushed down by the user, the cord will be free of stops 19 and will be pulled in and rewound on spool 7 by the force of coil spring 17.

Figure 2:
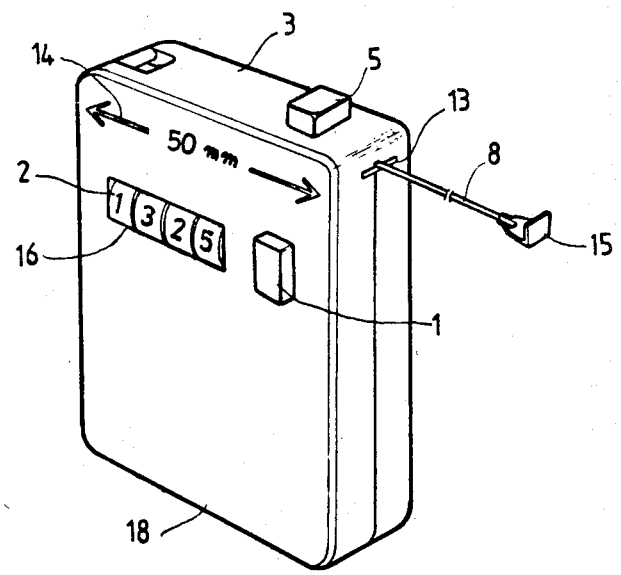
FIG. 2 is a perspective view of the embodiment of FIG. 1 with the cover in place.
Figure 3:
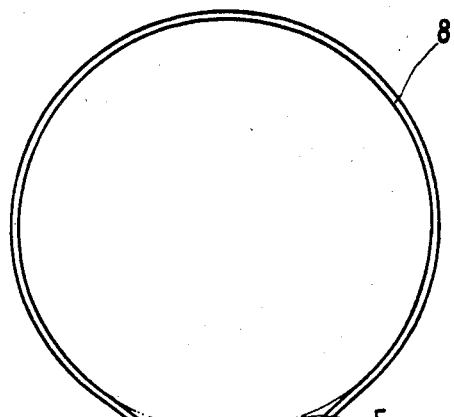
FIG. 3 shows an example of using the device.

When assembled, cord 8 passes from spool 7 first through a hole 9 in internal frame 4 for supporting the counter, around the knurled shaft 10 of the counter two or three times, out througn a second hole 9' in the frame, through the hole 12 in control button 5 and then out a slot 13 in the side of the rule's housing 3. The knurled surface 11 of shaft 10 prevents the cord 8 from sliding when it is pulled out or permitted to retract and rewind around spool 7. The housing of the rule also has a cover 18 as shown in FIG. 2, in which a window 16 is provided to expose the numerals of counter 2. As is conventional, the width 14 of the case is indicated so that the rule can be used for inside measurements.

In use, the user pulls out cord 8 by pulling on catch 15, which rotates shaft 10 proportionately to the length of cord being pulled out, which rotation rotates the numbers on the counter 2 so that the length being measured can be read directly in numerals on the counter 2.

A reset means comprising a conventional reset button 1 for resetting counter 2 to the zero position after use is provided. The reset button can also be used to measure the difference between two lengths. For example, if after the user measures a first length, and then pushes the reset button before rewinding the cord, if he then pulls out the cord 8 again to a second length, the indicated numerals of the counter 2 will be the difference between the first and second lengths.

FIGS. 4-9 show another embodiment of the present invention including error-correcting means 30, a variation of the control button and a magnifying lens to make the numbers easier to read.

Figure 5A:
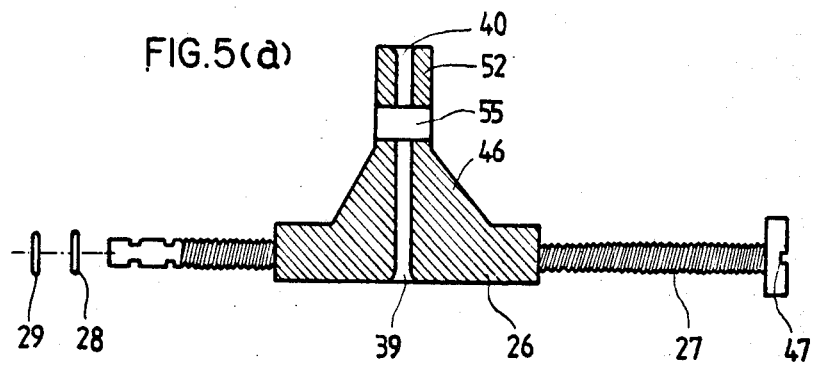
FIGS. 5 (a), (b) and (c) are detailed views of the error-correcting device.

In accordance with this embodiment, the error correcting means comprises a mechanical counter 21 having a tapered knurled shaft 31, a supporting plate 25 fixed to the housing 44 and a sliding plate 26 having a first and second hole 39 and 40 therethrough for guiding cord 23 (See FIG. 5(a)) and a hole 55 through which shaft 31 passes. Plate 26 is mounted for sliding movement with respect to tapered shaft 31 and a rotatable spool 24 on which measuring cord 23 is wound. Adjusting means externally adjustable by the user and comprising a screw 27 are provided for sliding plate 26 longitudinally of the shaft to thereby adjust the location where the cord passes around the shaft.

Figure 5B:
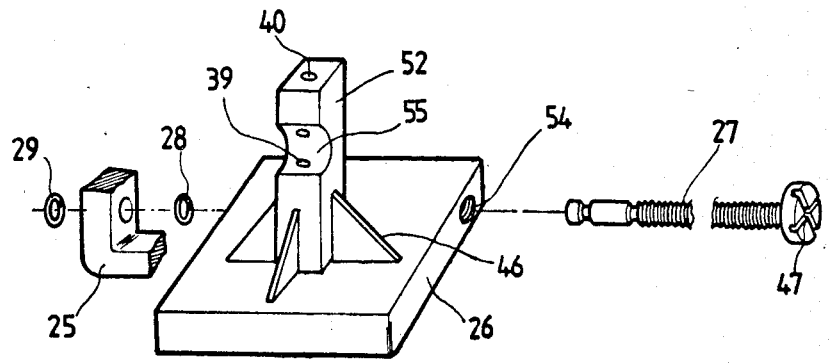

FIG. 5 shows in further detail the parts of the error-correcting device 30 which include sliding plate 26 and screw 27, the plate having a bar 52 in which holes 39, 40 are formed and four ribs 46 for support. A threaded hole 54 in plate 26 is coupled with screw 27. Grooves are formed on the tail of screw 27 for washers 28, 29, and a cross groove 47 is formed on the head of the screw 27 for connection with a screw driver.

Figure 4:
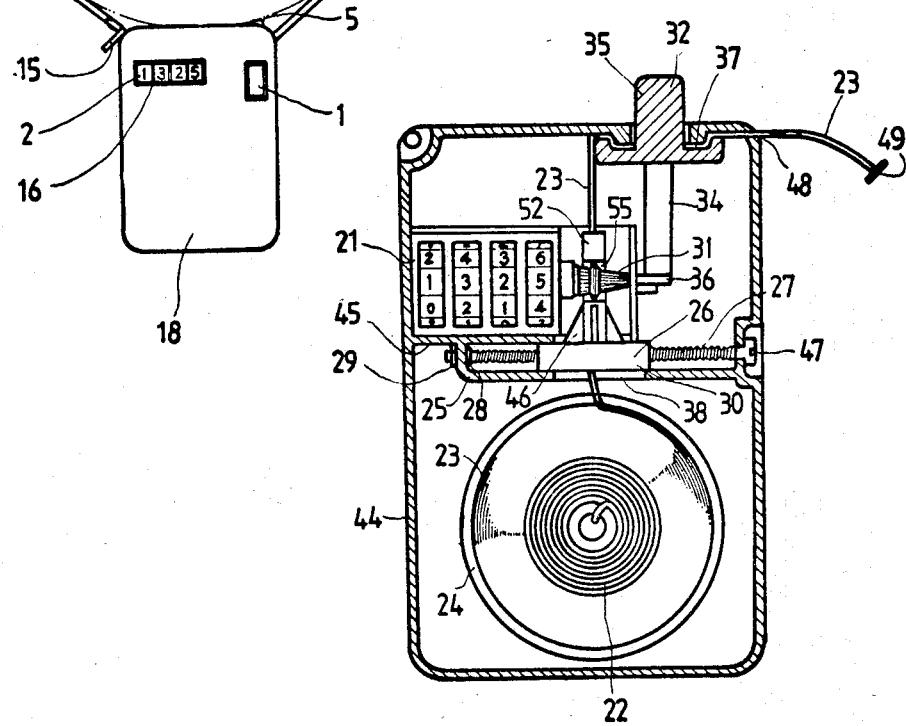
FIG. 4 is a front view of another embodiment of the present invention including an error-correcting device.
Figure 7:
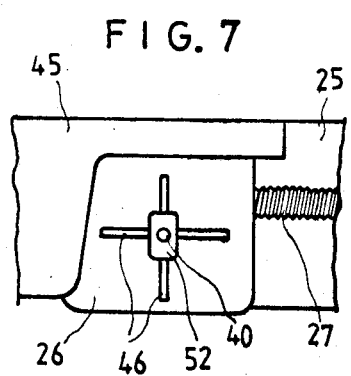
FIG. 7 is a partial-plan view of the error-correcting device of FIG. 5.
Figure 8:
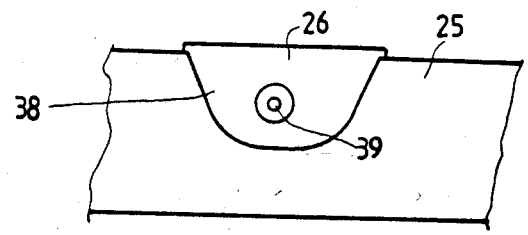
FIG. 8 is a partial-bottom view of the error-correcting device.

A connecting hole is formed on the left corner of supporting plate 25 for coupling screw 27 with washers 28, 29, and there is a hole 38 in the supporting plate 25 as shown in FIGS. 4 and 8. The right end of the bottom plate 45 of the numerical counter 21 is also partially cut, as best shown in FIG. 7, to permit bar 52 to be moved longitudinally of the tapered shaft 31. If the plate 26 is coupled to supporting plate 25 with screw 27 and washers 28, 29, the slider 26 moves according to the rotation of the screw 27.

The cord 23 from the spool 24 passes through the hole 38, hole 39 of slider 26, is wound two or three times around the tapered shaft 31 and then passes through hole 40 of the plate 26 and control button 35, and out through slot 48 in housing 44 where a knob 49 is attached at the end.

Figure 6A:
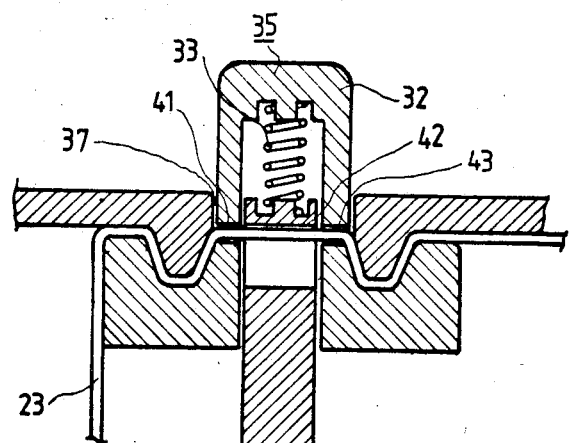
FIGS. 6 (a) and (b) are cross-sectional views of the control button of the device of FIG. 4.

As best shown in FIGS. 6(a) and (b) control button 35, similar to control button 5, consists of a first button 32 accessible by the user, a spring 33 and a second button 34 which contacts the reset button 36 of the mechanical counter 21. In this embodiment of the control button, the measuring cord 23 passes through three holes 41, 42, 43 in the control button 35 before passing out through slot 48 in the housing 44. The control button has two functions. The first function is to permit the cord to be pulled out smoothly when it is slightly depressed (see FIG. 6b) and the second function is to reset the numerical counter 21 when it is depressed further by pushing down on the counters reset button 36.

The aforementioned embodiment is designed to correct errors in the circumference of the shaft that may result from the manufacturing or assembling processes or with extended use, simply by adjusting the location where the cord passes around it and hence the relationship between the rotation of the shaft and the attached counter and the length of the cord.

When the user pulls out cord 23, tapered shaft 31 rotates and the number of rotations is proportional to the length pulled out. Therefore the amount of cord pulled out is directly indicated on the numerical counter 21.

Figure 9:
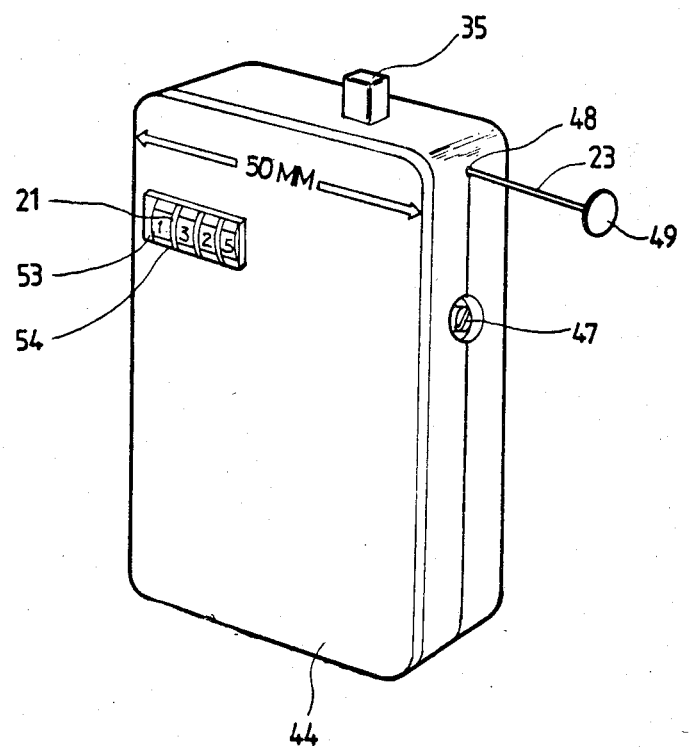
FIG. 9 is a perspective view of the embodiment of FIG. 4.

A lens 54, as shown in FIG. 9 is attached to the window 53 for magnifying the numerals of counter 21.

In use, and after the user has pulled out the required length and releases tension on cord 23, external button 32 moves upwards under the force of spring 33, as shown in FIG. 6(a), locking cord 23 between stops 37 on the housing button preventing it from being rewound on spool 24.

Figure 6B:
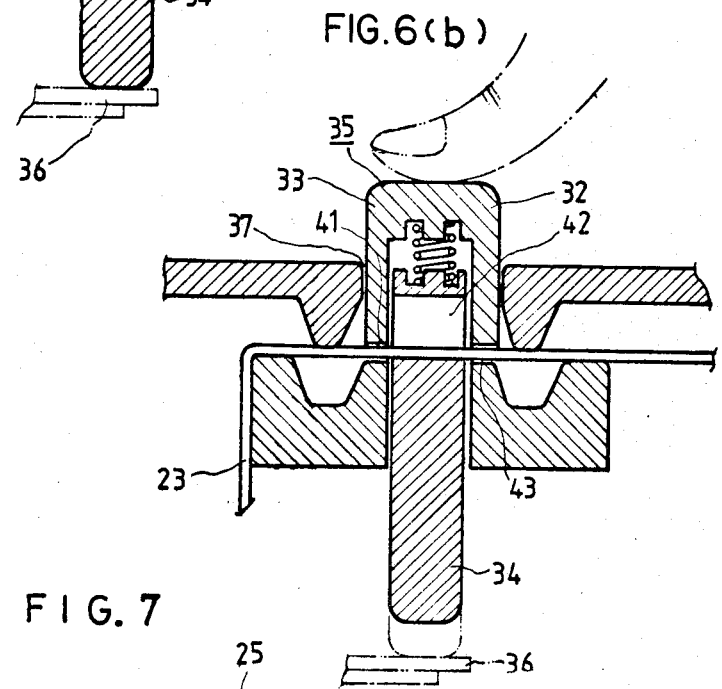

When the user wants to rewind the cord, he simply pushes button 32 downwards as shown in FIG. 6(b). Then the frictional force between stops 37 and button 32 is removed and the cord is then free to wind back on spool 24 under the force of coil spring 22. If the button 32 is pushed further down, the internal button 34 will push down on reset button 36 of the counter 21 returning the numerals to zero.

If an error occurs in the circumference of shaft 31, the winding position of the cord 23 on the shaft 31 can be adjusted simply by rotating screw 27, whereby the most suitable circumference of the shaft 31 can be selected.

Figure 5C:
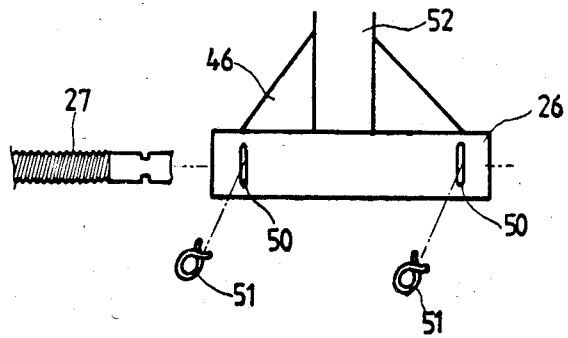

FIG. 5(c) shows another connection means of the plate 26 and screw 27. In this embodiment, the diameter of the hole 54 is a little larger than that of the screw 27, and slots 50 are formed on the rear side of plate 26. Washers 51 are coupled through slots 51 so that the plate functions as a nut.

Figure 10:
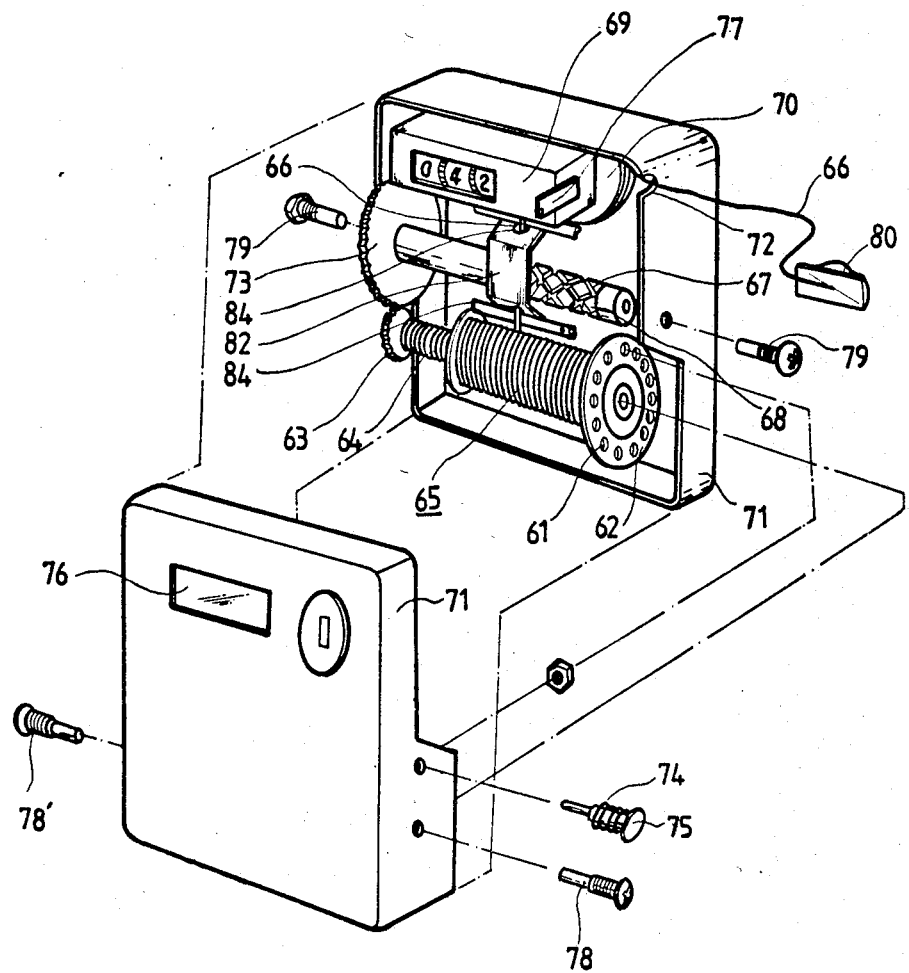
FIG. 10 is a separated-perspective view of another embodiment of the present invention.
Figure 11:
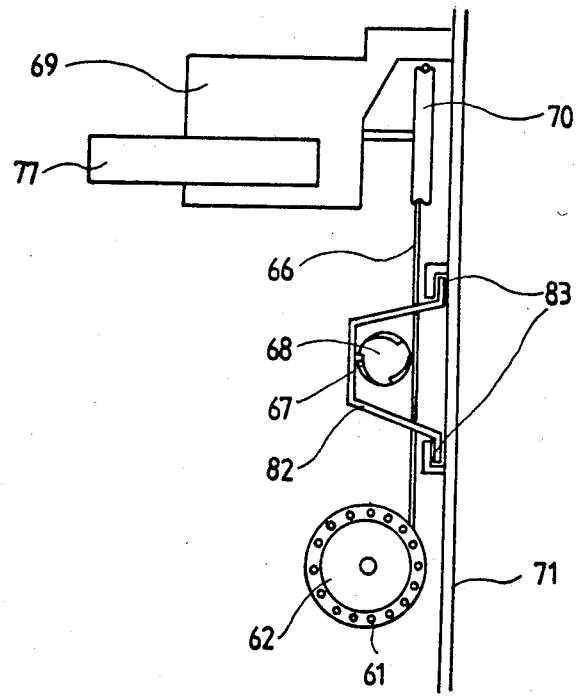
FIG. 11 is a partial-side view of the embodiment of FIG. 10.
Figure 12:
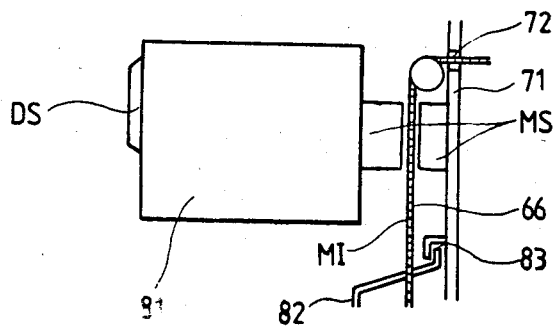
FIG. 12 is a partial-side view of an electronic measuring rule according to the present invention.

FIGS. 10 and 11 show yet another embodiment. FIG. 10 shows a guide bar 68 connected with spool 65 through gears 63, 73. Spool 65 is supported by shafts 78, 78' and guide bar 68 is supported by shafts 79 for rotation within the housing 71 of the rule. A coil spring 64 is mounted around shaft 78' beside spool 65 for rewinding the cord 66 about the spool and is twisted when the cord is pulled out.

Guide bar 68 winds cord 66 evenly on spool 65, the cord 66 moving back and forth when it is pulled out or rewound as a result of the cord passing through the spiral grooves 67 on guide bar 68 as shown in FIG. 11. A slider 82 is mounted for sliding back and forth movement in slots 83 in the housing and has holes 84 through which cord 66 passes to keep cord 66 in the groove of the guide bar.

The device includes a numerical counter 69, having a reset button 77, and a window 76 in its cover. A roller 70, is connected to the shaft of counter 69 and is sized so that its circumference directly reflects the length indicated on the counter.

In this embodiment holes 61 are provided on a plate 62 on one end of spool 65, that cooperate with a pin 75. After a user pulls out cord 66 through slot 72 in the housing by knob 80 the desired length, he pushes the pin 75 into a hole 62 to prevent the cord from rewinding until he has a chance to read the counter.

When the user takes his hand away from the pin 75, after he notes the length measured, spring 74 releases pin 75 from one of the holes 61, thus allowing cord 66 to be wound back on spool 65 by the force of the spring 64.

While the aforementioned embodiments use a mechanical device as the numerical counter, they can be replaced by an electronic device without departing from the scope of the invention.

To use an electronic counter, magnetic ingredients (MI) are coated or included in cord 66 at regular intervals, and a magnetic sensor (MS) connected to an electronic counter 81, is mounted in the housing of the rule beside the cord.

Figure 13:
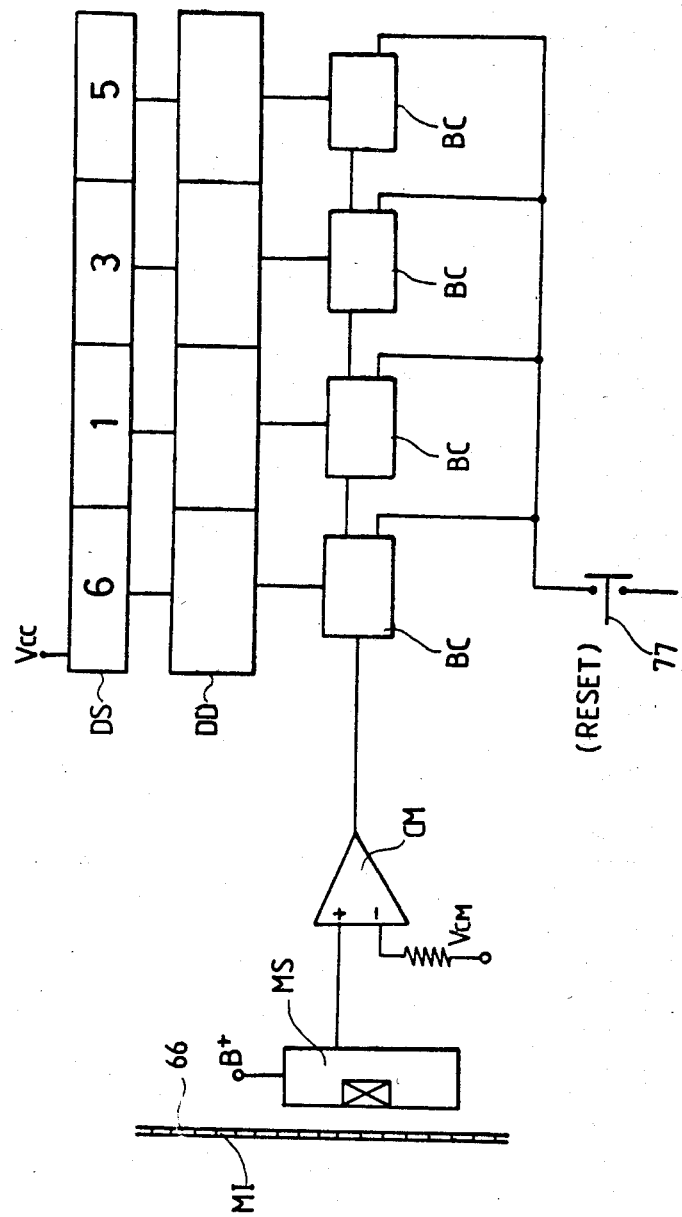
FIG. 13 is a block diagram of the electronic circuit used in the device of FIG. 12.

The magnetic sensor senses the number of magnetic ingredients and therefore the length of the cord passing it can be counted by the electronic circuit in the electronic counter 81. In other words, as shown more fully in FIG. 13, the magnetic ingredients are sensed by the magnetic sensor, and are compared with a reference signal ($V_{CM}$) by a comparator (CM), and then they are applied to a binary counter (BC). The binary counter counts the number of sensed ingredients and a decoder driver (DD) converts the binary numbers into decimals. The display (DS), which indicates decimals with LED or LCD, indicates the counted decimals on the display panel.

What is claimed is:

1. A measuring rule comprising a housing, a numerical counter having a tapered knurled shaft mounted for rotation within the housing, a rotatable spool mounted in the housing, an elongated cord wound around the spool, spring bias means for rewinding the cord around the spool and stop means for automatically preventing rewinding of the cord about the spool until the stop means is disengaged by the user of the rule while permitting the cord to be freely pulled off the spool, said cord passing from the spool around the knurled shaft to turn it and the counter as the cord is pulled off the spool, through the stop means and out of the housing, whereby the length of cord pulled out of the rule and passing around the knurled shaft is indicated by the numerical counter, and error correcting means for adjusting the location of the cord where it passes around the tapered shaft along its length.

2. The rule of claim 1, wherein the spring bias means for rewinding the cord on the spool is a coil spring.

3. The rule of claim 1, wherein the stop means comprises a button engagble by the user from outside the housing and operable between a locking and an unlocking position and spring means for maintaining said button in a locked position, said button moving to its unlocked position against the bias of the spring means to permit free flow of the cord through it either when the button is pressed by the user or the cord is being pulled out of the rule, but returning to its locked position as soon as either ceases.

4. The rule of claim 1, wherein the error correcting means comprises a plate having a hole through which the cord passes before it passes around the tapered knurled shaft and means externally adjustable for sliding the plate longitudinally of the shaft to thereby adjust the location where the cord passes around the shaft.

5. The rule of claim 4, wherein the plate extends around the shaft so that the cord passes through a first hole in the plate, around the shaft and then through a second hole in the plate before passing through the stop means.

6. The rule of claim 1, including reset means for returning the numerical counter to the zero position following use.

* * * * *